April 4, 1972     G. MESSNER     3,654,120
ELECTROLYTIC CELL INCLUDING BIPOLAR ELECTRODES WITH -
RESIN-IMPREGNATED HOLES IN THE ELECTRODE BODY
Filed July 29, 1969     4 Sheets-Sheet 1
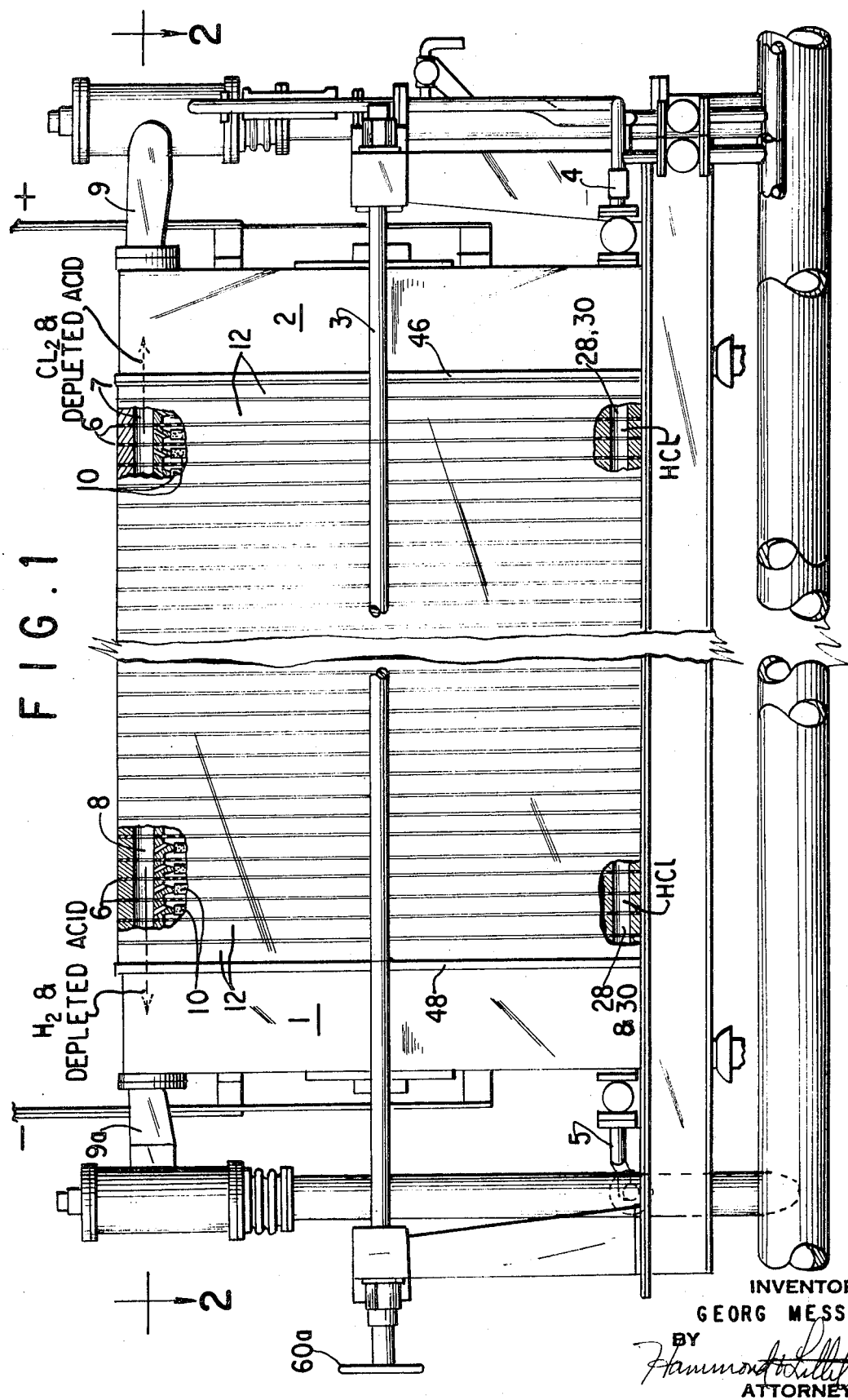
INVENTOR
GEORG MESSNER
BY
Hammond & Littell
ATTORNEYS

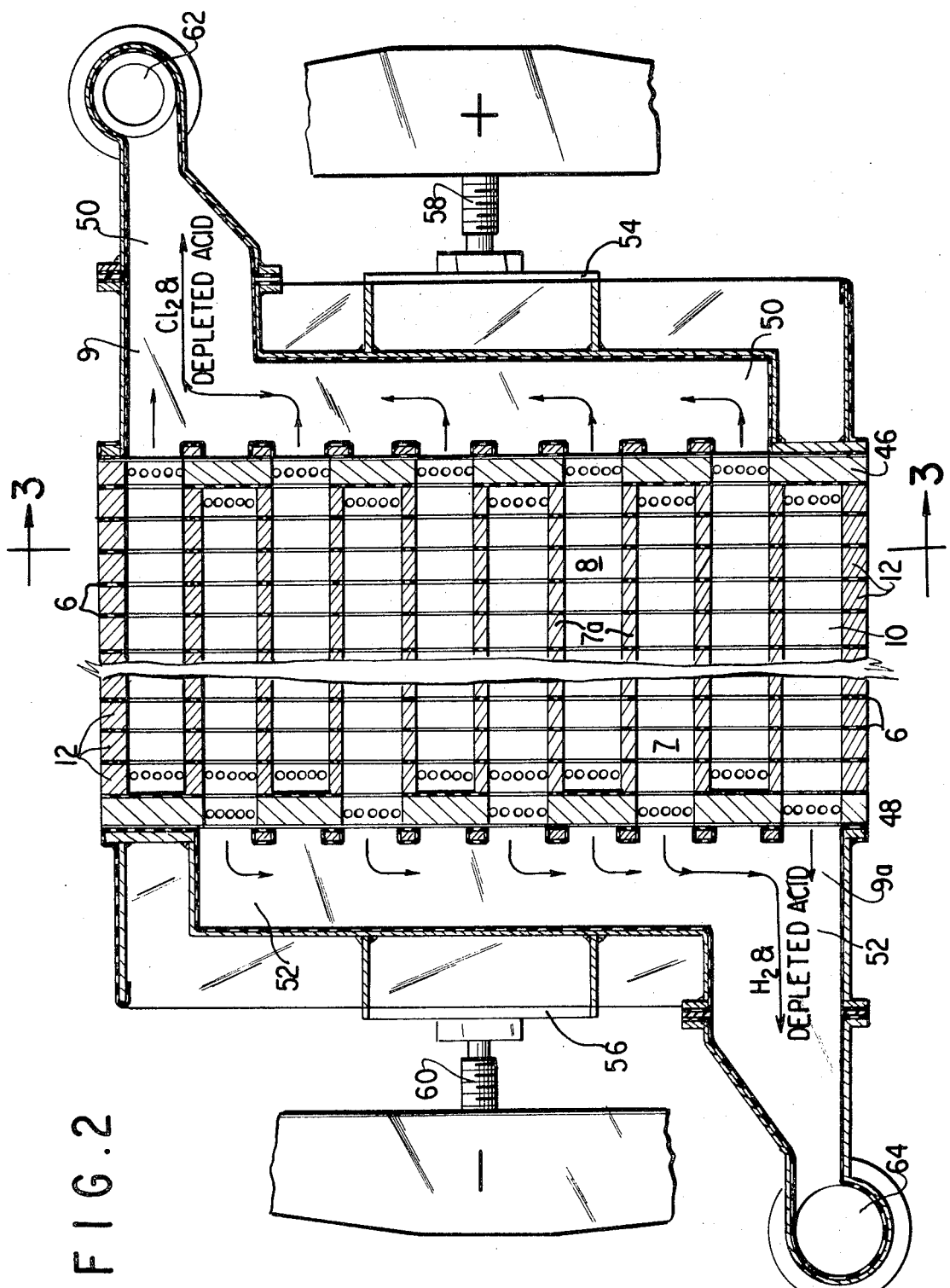

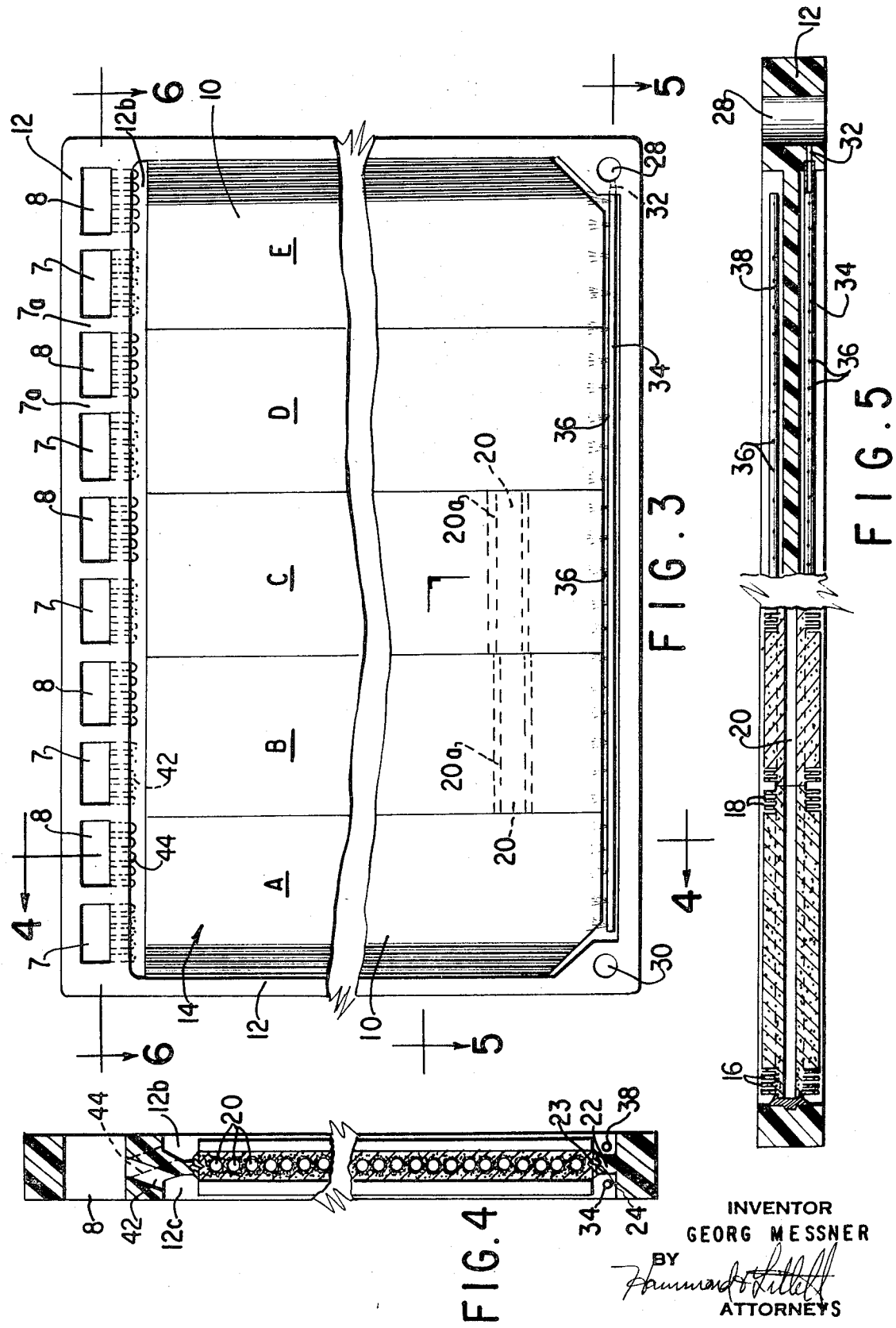

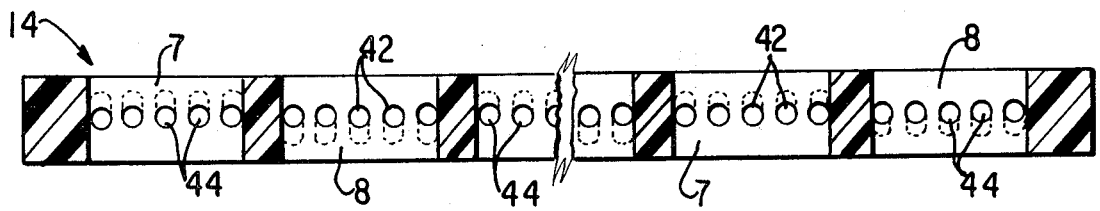
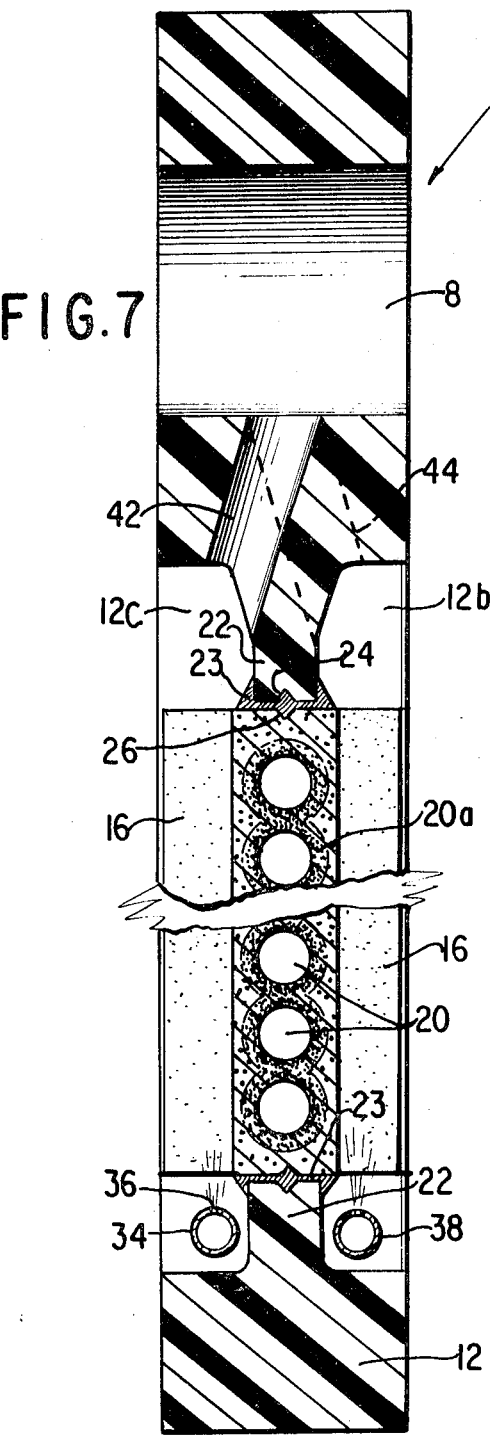
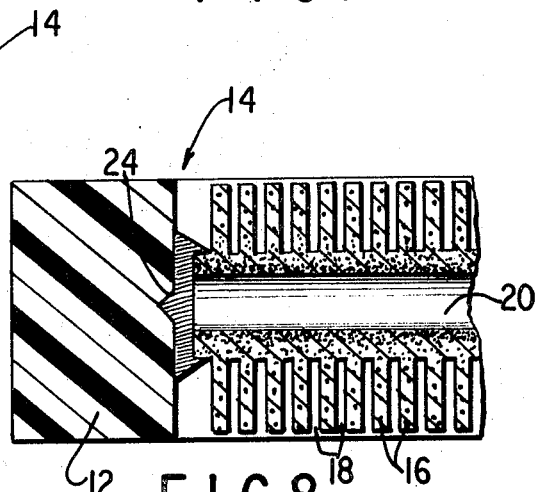
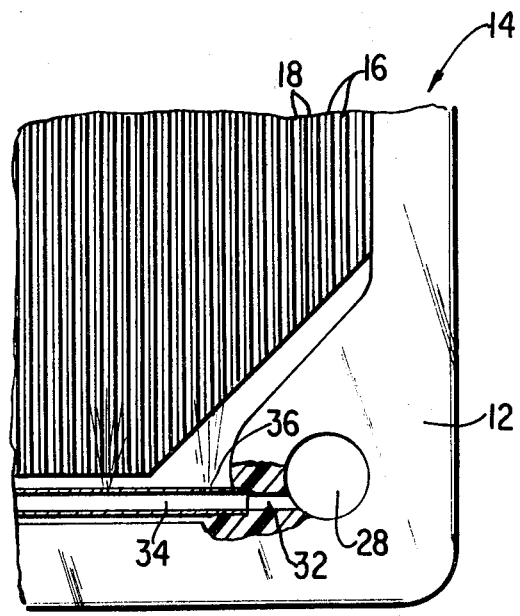
INVENTOR
GEORG MESSNER 3,654,120
ELECTROLYTIC CELL INCLUDING BIPOLAR ELECTRODES WITH RESIN-IMPREGNATED HOLES IN THE ELECTRODE BODY
Georg Messner, Munich, Germany, assignor to Nora International Company, Panama City, Panama
Filed July 29, 1969, Ser. No. 845,701
Int. Cl. B01k 3/04; C22d 1/02
U.S. Cl. 204—255        11 Claims

ABSTRACT OF THE DISCLOSURE

Describes a cell and process for the electrolysis of hydro-halogen solutions composed of a plurality of unit cells clamped together in a filter press arrangement, wherein each unit cell consists of a graphite electrode and a frame disposed peripherally on the electrode, a diaphragm between each unit cell, each bipolar graphite electrode having a plurality of holes between the active faces of the graphite electrodes with the pores in the graphite in the vicinity of the holes being impregnated or sealed with a resin to form a continuous barrier through the center of the electrode which is effective in minimizing loss of current due to the migration of ionic currents through the electrodes. The frame is provided with a plurality of separate exit ports for separately discharging halogen and hydrogen, together with the spent hydro-halogen solution.

PRIOR ART

Bipolar graphite electrolyzer cells of the type described in U.S. Pats. 3,236,760 and 3,242,065 have been tried and have not proven satisfactory because of leakage of ionic current through the pores of the graphite and because of low efficiency per unit of electricity used and for other reasons.

Graphite has been used in these and other bipolar electrolyzers since it is inexpensive, is resistant to corrosive attack by halogen gases and hydro-halogen solutions, is a relatively good conductor of electricity, and has sufficient mechanical stability. However, because the graphite is porous, ionic conduction occurs across the bipolar graphite electrodes during an electrolysis process which results in current losses which may be as high as 30%, depending upon the volume percentage of pores of the graphite.

The problems of current loss due to ionic migration through the graphite electrode is a serious one since it directly affects the cost of halogen gas production. A number of solutions for this problem have been proposed which have proved to be unsatisfactory. For example, it has been proposed to coat one face of a graphite electrode with a material which prevents ionic conduction through the graphite. Although this resulted in lower ionic current losses and higher yield of electrolysis product, it was impractical from the cost standpoint because the face of the graphite electrode had to be thoroughly cleaned to render the graphite surface electrically conducting. The cleaning was accomplished by removing the insulating material from contact points to render the graphite electrode electrically conducting.

In another attempt to resolve the problem of excessive ionic current losses, portions of a graphite electrode were removed so that the electrode, when viewed from above, resembled the letter H. The vacant spaces created by removing portions of the electrode were filled with a material which was electrically insulating as well as resistant to attack by corrosive gases and solutions. This material, which formed a barrier to the passage of ions through the graphite electrode, also acted as a barrier to the passage of electronic current in the zones of the barrier, so this method also was unsuccessful.

OBJECTS OF THIS INVENTION

It is an object of this invention to overcome the disadvantages of the prior art relating to current losses due to ionic migration across the porous structure of bipolar graphite electrodes by minimizing ionic migration across the electrode, leaving conduction of electronic current unaltered.

It is a further object of this invention to improve the prior art graphite electrodes by drilling a plurality of spaced holes in the graphite electrodes and impregnating the graphite material surrounding the holes with a resin so that an impervious barrier to ionic conduction is formed within the electrode structure while the electronic conduction paths remain substantially unaltered.

Another object of this invention is to reduce the thickness of the individual cell units whereby the length of a forty unit cell, for example, may be reduced by as much as 12% over previous filter cell electrolyzers of this type.

Another object is to withdraw the halogen gas and hydrogen and spent acid through exit passages running longitudinally of the cell over the top of the individual cell units whereby the size of the gas and spent acid passages may be increased to greatly lower the operating pressure and increase the efficiency of these electrolyzer cells.

With the improved construction and improved operating conditions of the cell herein described, the current load to these electrolyzers can be drastically increased and the additional halogen gas and hydrogen released may be readily carried away through the enlarged outlet passages. The new electrodes show a very low voltage drop (of the order of 2–3 millivolts), even when a high current is passed through the electrodes. The thickness of the individual electrodes and frames may be reduced by about 11%, resulting in further construction savings.

Other objects and advantages of this invention will become apparent as the description thereof proceeds.

The invention

The use of this invention will be described in connection with electrolysis of hydrochloric acid, to produce chlorine and hydrogen as electrolysis products. Other hydro-halogen solutions, such as hydrogen bromide, hydrogen iodide, etc., may be electrolyzed in a similar manner, and the invention can be used for the oxidation of organic compounds on the anodic side of the electrodes and for the reduction of organic compounds on the cathodic side of the electrodes.

This invention overcomes disadvantages of prior bipolar graphite electrodes by the elimination of current losses due to ionic migration through the pores of electrodes and by improved operation of the cell. Migration of ions across the porous graphite electrodes is impeded by providing a barrier in the form of a series of spaced holes with the areas surrounding the holes impregnated with a resin which is non-conducting in terms of ion transfer. Although the ionic conduction is empeded by such a barrier, electronic conduction remains unaltered since a carbon-to-carbon electronic path through the electrode still exists. By this invention, the negative influence of current loss by ionic migration is almost eliminated while electronic conduction of current remains unaffected.

In the accompanying drawings, which illustrate a preferred embodiment of the invention:

FIG. 1 is a side elevation with parts broken away to show the interior construction of a filter press cell;

FIG. 2 is a sectional plan view along the line 2—2 of FIG. 1;

FIG. 3 is a side view of one of the cell elements substantially along the line 3—3 of FIG. 2;

FIG. 4 is a sectional view of the electrode along the line 4—4 of FIG. 3;

FIG. 5 is an enlarged view, looking downward, substantially along the line 5—5 of FIG. 3;

FIG. 6 is an enlarged view of the hydrogen, chlorine and spent acid discharge passages, substantially along the line 6—6 of FIG. 3;

FIG. 7 is an enlarged vertical sectional view through one of the graphite electrodes, showing the holes and surrounding impregnation;

FIG. 8 is an enlarged horizontal section through a portion of one of the graphite electrodes; and FIG. 9 is a detail view of one of the acid inlet passages and the lower portion of a graphite electrode.

In the assembled filter press cell unit illustrated in FIGS. 1 and 2, the individual cell units, each consisting of a bipolar graphite electrode 10 mounted in a surrounding Haveg frame 12, are mounted between end plates 1 and 2, urged together by tie rods 3 and a pressure screw 60 operated by a hand wheel 60a.

Saturated HCl (33%) is fed into the filter press assembly of graphite electrode units through piping 4 and 5 (FIG. 1), which communicate with passages 28 and 30 extending through all the electrolyzer units and which passages 28 and 30 communicate with the bottom of each side of each graphite electrode through passages 32 and pipes 34 and 38. Chlorine and depleted acid discharge passages 7 extend across the top of the frames surrounding the graphite electrodes to discharge chlorine and depleted acid from the assembled cell through the manifold 9 and hydrogen and depleted acid passages 8 extend across the top of the frames to discharge hydrogen and depleted acid from the cell through manifold 9a.

Between each electrode 10 and the next adjacent electrode, a diaphragm 6 is mounted and held in place by the Haveg or other frame units 12 which surround the graphite electrodes. The diaphragms separate the hydrogen discharge channels from the chlorine discharge channels and have holes corresponding to the acid inlet passages 28 and 30 and the chlorine and depleted acid discharge passages 7 and the hydrogen and depleted acid discharge passages 8. The diaphragms 6 and the intervening sections 7a between the passages 7 and 8 keep the chlorine and hydrogen separated. The diaphragms may be formed of woven polyvinyl chloride cloth or any other suitable material.

The graphite electrode assembly 14 within each frame 12 consists of graphite plates A, B, C, D and E (FIG. 3), each positioned in abutting relationship to the other graphite plates and bounded by frame 12. Frame 12 is made of or coated with a material resistant to the corrosive atmosphere of chlorine gas and hydrochloric acid solutions. The graphite plates are secured within frame 12 by means of a circumferential flange 22 (FIGS. 4 and 7) spaced inwardly of the outer edges of the frame and by cement 23. Notches 24, 26 may be provided in the flange 22 as well as in the graphite plates for imparting additional mechanical stability to the entire assembly. As shown more clearly in FIGS. 3, 8 and 9, the surfaces of the graphite plates are grooved and form ribs 16 and recesses 18, which recesses serve as channels for the hydrogen gas on one side of the electrode and the chlorine gas on the other side thereof, which gases rise with the depleted acid to the top of the electrodes where the gases are separately channeled to their respective collecting chambers.

The frames 12 are provided with chlorine and depleted acid and hydrogen and depleted acid gathering compartments 12b and 12c across the top, above the recesses or channels 18 in the graphite anodes. The compartments 12b and 12c are connected with the exit ports 7 and 8 by passages 42 and 44 through which the chlorine and spent acid and the hydrogen and spent acid flow into the passages 7 and 8, respectively.

Each of the graphite plates is provided with a plurality of transversely disposed spaced holes 20 which extend horizontally through the electrode. The holes in sections A, B, C, D and E preferably are in registry, but exact registry is not necessary. One, two or more rows of holes can be provided, and their disposition may be horizontal or vertical, although horizontal disposition of the holes is preferred since the resulting graphite plate has greater mechanical rigidity and registry of the holes presents no problems.

To provide a barrier to ionic conductance through the pores around the holes in the graphite electrode, the graphite surrounding the holes is impregnated with a resin barrier 20a which fills or seals the pores around the holes and thus interrupts the electrolytic path by which the ions are transported. The impregnation is accomplished by positioning the graphite plates in such a manner that the holes are disposed in a vertical position, and filling the interior of the holes with resin in liquid form under a pressure of about 3–4 atmospheres. As the holes are filled with resin under pressure, the resin enters the pores surrounding the holes to displace any liquid or gas which was present therein. In the absence of resin impregnation, the pores around the holes 20 are filled with hydrochloric acid solution during the process of electrolysis of the hydrochloric acid solution. The hydrochloric acid solution is a good electrolyte and forms an electrolytic path through the electrode for conduction of ions. Since one face of a bipolar electrode is positive relative to the opposing face, conduction of ions from one face of the electrode to the other serves to dissipate current by neutralization of electrical charges. This effect is analogous to the effect produced when the confronting charged electrodes of a capacitor are brought into contact with each other.

The impregnation of the graphite surrounding the holes is continued until a predetermined volume of resin has been introduced into the pores, at which time, the impregnation is discontinued and the resin in the porous structure of the electrode is hardened during heat treatment of the graphite plate. Sufficient amount of the resin must be admitted into the porous structure of the electrode to form a continuous barrier through the center of the electrode, so that the resin layer 20a around one hole contacts the resin layer around the adjacent hole. A single row of holes 20 with surrounding impregnation 20a is shown in FIGS. 4 and 7 and two of the holes 20 with surrounding impregnation 20a are shown in dotted lines in FIG. 3.

Any suitable resin can be used which is resistant to the corrosive environment of the electrolyzer cells under operating conditions. The preferred materials are phenolic resins, such as Bakelite, as well as a solution of $Na_2SiO_3$. Phenolic resins may be prepared by condensation of formaldehyde with phenols. The $Na_2SiO_3$ solution will precipitate silica in the presence of an acid, which will seal the pores, thus also effectively interrupting the electrolytic path. The resin impregnated area around each hole is indicated by the circles 20a around the holes 20 in FIG. 7.

The bipolar graphite electrodes may also be impregnated to produce a barrier against the passage of ionic currents by impregnating the porous graphite electrodes with an organic material such as a phenolic resin, heating the impregnated graphite to harden the resin and then heating to the temperature where coking of the resin occurs. This treatment may be repeated several times until the desired degree of tightness of the pores is reached. This method is effective to form barriers to ionic currents with or without the formation of holes 20 in the graphite electrodes.

At the bottom of each frame 12, on each side, there are two passages 28, 30 through which the hydrochloric acid is fed into the interior of the cells by means of connections 32. Passages 28 and 30 communicate with conduits 34 and 38 (FIG. 5), which may be PVC pipes, perforated at spaced intervals, as indicated by 36, to admit the hydrochloric acid solution to one side of a graphite electrode. The use of PVC pipes is recommended since their use will drastically reduce current leakage through the acid solution feed channels. Passage 30 communicates with conduit 38 by way of a passage which is not shown, which feeds hydrochloric acid to the other side of each graphite anode. Conduit 38 may likewise be a PVC pipe, perforated at spaced intervals, for the purpose of admitting hydrochloric acid solution into the space between the opposing electrodes. The current leakage is substantial when one considers that the passages 28 and 30 may be 2″ in diameter and the impressed voltage may be up to 100 volts.

At the upper portion of each electrode, a plurality of exit ports 7 and 8 are provided in the frames 12. The exit ports 7 and 8 communicate alternately with the anodic or cathodic side of the electrode and with compartments 12b and 12c by means of passages 42, 44. Hydrogen is produced on the cathodic face of the electrode and bubbles upwardly leaving the electrolyzer, together with the spent hydrochloric acid solution, through passages 44, shown by dotted lines in FIG. 7 and flows into exit ports 7. Chlorine is formed on the anodic face of the electrode and leaves the electrolyzer cell, also accompanied by spent hydrochloric acid solution, through passages 42 and flows into exit ports 8. FIGS. 4 and 7 further illustrate communication of passages 42 and 44 with their respective anodic and cathodic discharge ports 7 and 8. The view shown in FIG. 7 is taken on a plane through an exit port of the assembled electrolyzer cell.

FIGS. 1 and 2 illustrate a plurality of bipolar graphite electrodes 10 of substantially identical construction, with an anodic end section 46, a cathodic end section 48, a chlorine and spent hydrochloric acid manifold 50 and the corresponding hydrogen and spent acid manifold 52, clamped together in a filter press arrangement between end plates 54, 56. The end plates 54, 56 can be pressed toward each other by means of a screw 60 and hand wheel 60a. Conduits 62, 64 are adapted to convey the gases out of the electrolyzer cell to storage tanks and the acid to resaturation towers.

In the electrolyzer, the bipolar graphite electrodes 10 are mounted, side by side, between end plates 54, 56 and the frames 12 are pressed together, as in a filter press, into a fluid tight arrangement. A diaphragm 6 is provided between the individual bipolar electrodes to prevent hydrogen and chlorine from mixing and causing an explosion. The diaphragms also act as a seal between each of the frame members 12.

In operation, hydrochloric acid solution (33%) to be electrolyzed is introduced into anodic and cathodic compartments by means of inlet passages 28, 30 and perforated conduits 34, 38. Each anodic and cathodic compartment is defined by one face of the electrode, the diaphragm or separator and the walls of the frame 12. As the acid solution rises in each compartment, the cell is connected to a source of electrical current which initiates electrolytic reaction at the respective faces of the electrodes. Hydrogen forms on the cathodic surface of the electrode and rises in the channels 18 between ribs 16 to the top of the electrode, together with depleted acid solution (18%). When the top of the electrode is reached, hydrogen and the spent acid solution from each cathodic compartment exit through passages 44 (FIGS. 6 and 7), into manifold 52 and out through discharge conduit 64. Chlorine is formed on the surface of the anodic face of the electrodes and also ascends, together with the spent acid solution, to the top of the electrode when it is withdrawn together with the spent acid solution, through passages 42 into manifold 50 and out through discharge conduit 62. The hydrochloric acid solution supplied to the electrolyzer cell is generally 30–33% acid, while the spent acid solution may be of the order of about 18%.

This construction has several advantages over the prior art. The current loss due to ionic conduction is essentially eliminated by providing a barrier in the electrodes as described above, so that less electricity is required to produce an equivalent yield and, therefore, the cost of products declines. The electrodes 10 may be made thinner since they have an artificially produced barrier to the passage of ionic currents through the electrodes. By the use of the electrodes of the present invention, the thickness of each electrode can be reduced by more than 10% (from approximately 78 mm. to 68 mm.). The reduction in thickness also results in a corresponding reduction in thickness of the surrounding frames 12 and in the length of the entire electrolyzer cell. The reduction in the length of the electrolyzer cell also saves on auxiliary equipment. If the dimensions of the electrodes were to remain unchanged, a greater yield of products would be obtained due to the greater amount of current available to effect electrolysis of the acid solution.

The plurality of exit ports of greater size in the frame of the electrodes have an advantage over the prior art bipolar graphite electrodes which only had one discharge port on the cathodic side and one discharge port on the anodic side of the electrode. This advantage resides in the fact that by providing more space through which the gases and the spent acid solution are withdrawn, the velocity of escaping gases is reduced with a concomitant reduction in pressure drops between the compartments. With the plurality of exit ports as described above, it is also easier to maintain a balance of chlorine gas pressure and hydrogen gas pressure in the respective compartments. Since chlorine is somewhat soluble in hydrochloric acid, reduction of pressure will shift the equilibrium towards lower solubility.

Various modifications of the bipolar graphite electrodes and of the method of treating them may be made without departing from the spirit or the scope of this invention. Although the invention has been described in connection with graphite eletrcodes, it should be apparent that it can be applied to any porous material in which it is desired to provide an ionic current barrier and that it may be applied to the electrolysis of other hydro-halogen solutions and other solutions which can be disassociated by electrolysis.

What is claimed is:

1. In an electrolyzer of the filter press type, a plurality of bipolar graphite electrode units, a frame around each electrode unit, a diaphragm between each graphite electrode unit, a gas and depleted acid gathering compartment in said frame at each side of each graphite electrode unit, means to separately discharge gas and depleted acid from each of said gathering compartments and means in the interior of each of said graphite electrode units to block the passage of ionic currents through said electrode.

2. The electrolyzer of claim 1 in which the means to block the passage of the ionic currents consists of a series of holes in each of the bipolar graphite electrode units with resin impregnation around each hole whereby passage of ionic current is blocked and passage of electronic current permitted.

3. The electrolyzer of claim 1 in which the means to block the passage of ionic current comprises resin impregnated pores in the bipolar graphite electrode units in which the resin has been coked whereby passage of ionic current is blocked and passage of electronic current is permitted.

4. In an electrolyzer cell having a plurality of unit cells arranged in filter press construction, a diaphragm between each unit cell serving to separate adjacent unit cells, adjustable clamping means for clamping into a stack the unit cells in fluid-tight contact, means for impressing electric current across the cell, each unit cell comprising a bipolar graphite electrode and a frame surrounding the electrode, inlet ports at the bottom of the frame which are in alignment with inlet ports in each unit cell, discharge means at the top of the frame communicating with similar means in each unit cell, the improvement comprising a plurality of spaced holes in said electrode, the graphite material in the vicinity of the holes being impregnated with a resin to form a continuous barrier to ionic conduction through said electrode.

5. Electrolyzer cell of claim 4 including means for mounting said electrode within the confines of said frame so as to form a compartment for an electrolyzing solution on each side of said unit cell, perforated conduits disposed on each side of said electrode at the lower extremity thereof, passage means extending between said perforated conduits and said inlet ports whereby an electrolyzing solution is supplied to each compartment through the inlet ports and perforations in the conduits.

6. Electrolyzer cell of claim 5 wherein said discharge means includes a plurality of exit ports, passage means providing communication between said exit ports and said compartments, said exit ports alternately communicating with a compartment on one side of said electrode and a compartment on the opposite side of said electrode.

7. Electrolyzer cell of claim 6 including a plurality of spaced ribs disposed on face surfaces of said electrode.

8. Electrolyzer cell of claim 6 including a terminal unit cell at each end of said stack, means in association with each of said terminal unit cells for effecting conveyance of chlorine and hydrogen, together with the spent electrolyzing solution, separately and in opposite directions, a chamber arranged exteriorly and in communication with each of said terminal unit cells for conveying the gases and the spent electrolyzing solution out of said electrolyzer cell and to a discharge conduit.

9. Electrolyzer cell of claim 8 wherein said means includes a first barrier means to block the passage of chlorine and the spent electrolyzing solution in one terminal unit cell and a second barrier means to block the passage of hydrogen and the spent electrolyzing solution in the other terminal unit cell.

10. An electrolyzer of the filter press type including a frame surrounding a graphite bipolar electrode body, said graphite bipolar electrode body being spaced inwardly of the outer surface of said frame so as to form a compartment for an electrolyzing solution on both sides thereof, inlet ports at the lower corners of said frame, a perforated conduit positioned on each side of said graphite bipolar electrode body within the confines of said frame at the lower end of said frame and said graphite bipolar electrode body, passages providing communication between said conduits and said inlet ports, a plurality of exit ports in the top portion of said frame, and passage means providing communication between said exit ports and said compartments, said electrode body having a plurality of spaced holes between the active faces of the electrode body and the graphite pores adjacent to the holes being impregnated with a resin to form a continuous barrier to ionic conduction through said electrode.

11. Electrolyzer of claim 10 wherein said exit ports alternately communicate with said compartment on one side of said electrode and said compartment on the other side of said electrode.

References Cited
FOREIGN PATENTS

| | | | |
|---|---|---|---|
| 864,245 | 4/1941 | France | 204—255 |
| 1,246,687 | 8/1967 | Germany | 204—258 |

JOHN H. MACK, Primary Examiner

W. I. SOLOMON, Assistant Examiner

U.S. Cl. X.R.

204—284, 294